United States Patent
Raynor

(10) Patent No.: US 9,843,757 B2
(45) Date of Patent: Dec. 12, 2017

(54) OPTICAL ELECTRONIC DEVICE INCLUDING ENHANCED GLOBAL SHUTTER PIXEL ARRAY AND RELATED METHODS

(71) Applicant: STMICROELECTRONICS (RESEARCH & DEVELOPMENT) LIMITED, Marlow Bucks. (GB)

(72) Inventor: Jeffrey M. Raynor, Edinburgh (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 0 days.

(21) Appl. No.: 14/748,487

(22) Filed: Jun. 24, 2015

(65) Prior Publication Data

US 2016/0381308 A1 Dec. 29, 2016

(51) Int. Cl.
| | |
|---|---|
| H04N 5/378 | (2011.01) |
| H04N 5/363 | (2011.01) |
| H04N 5/3745 | (2011.01) |
| H04N 5/225 | (2006.01) |
| H04N 5/374 | (2011.01) |

(52) U.S. Cl.
CPC .......... *H04N 5/378* (2013.01); *H04N 5/2256* (2013.01); *H04N 5/363* (2013.01); *H04N 5/3742* (2013.01); *H04N 5/37452* (2013.01)

(58) Field of Classification Search
CPC .... H04N 5/353; H04N 5/3745; H04N 5/2256; H04N 5/2354; G03B 15/02–15/05; G03B 2215/05–2215/0596; G06K 2209/401; F21K 5/023; F21K 5/026
See application file for complete search history.

(56) References Cited

U.S. PATENT DOCUMENTS

| | | | |
|---|---|---|---|
| 2005/0062864 A1* | 3/2005 | Mabuchi | H04N 3/155 348/294 |
| 2009/0256060 A1* | 10/2009 | Meynants | H04N 5/353 250/208.1 |
| 2010/0118135 A1* | 5/2010 | Vdolek | H04N 7/183 348/87 |
| 2010/0201797 A1* | 8/2010 | Shizukuishi | A61B 1/045 348/68 |
| 2010/0328466 A1* | 12/2010 | Erel | G08B 13/19619 348/164 |

FOREIGN PATENT DOCUMENTS

| | | | | |
|---|---|---|---|---|
| GB | 2487943 | | 8/2012 | |
| GB | WO2012107750 | * | 8/2012 | H04N 5/378 |

* cited by examiner

*Primary Examiner* — Christopher K Peterson
(74) *Attorney, Agent, or Firm* — Slater Matsil, LLP

(57) ABSTRACT

An optical electronic device may include a plurality of different optical sources, and a global shutter sensor including an array of global shutter pixels, with each global shutter pixel including a plurality of storage elements. A controller may be coupled to the plurality of optical sources and the global shutter sensor and configured to cause a first optical source to illuminate and a first storage element in each global shutter pixel to store optical data during a first integration period, cause a second optical source to illuminate and a second storage element in each global shutter pixel to store optical data during a second integration period, and output the stored optical data from the first and second storage elements of the global shutter pixels after the first and second integration periods.

21 Claims, 9 Drawing Sheets

OPTICAL ELECTRONIC DEVICE INCLUDING ENHANCED GLOBAL SHUTTER PIXEL ARRAY AND RELATED METHODS

TECHNICAL FIELD

The present invention relates to the field of electronic devices and, more particularly, to optical electronic devices and related methods.

BACKGROUND

Image sensors are used for a wide variety of applications such as digital still cameras, machine vision, automotive and gaming, etc. Most 2D image sensors have a readout block which is shared among multiple pixels (typically one column's worth). Hence it is not possible to read out multiple rows at a time and so the rows are read out in a sequential manner. As each pixel typically collects light for the same amount of time, the rows of the sensor are sequentially reset. (The time between a pixel's reset and a pixel's readout is its exposure, also known as integration time). If an object (or sensor) is moving during the readout, there will be artifacts due the sequential nature of the reset and readout. This is called rolling blade shutter artifacts, as they are similar to silver-halide film sensors and the mechanical shutter blades and their associated artifacts.

As a result of such artifacts, a different pixel design is sometimes employed in digital image sensors, namely "global shutter pixels". In these types of pixels, there is a storage element inside the pixel. In a typical configuration, all pixels on the sensor are simultaneously reset, simultaneously exposed and then the signal information is simultaneously transferred to each pixels' respective storage. The storage pixels are then read out, typically row sequential. As all the pixels are exposed at the same time, there is no rolling blade shutter artifacts.

While avoiding rolling shutter blade artifacts is advantageous, further enhancements to global shutter pixel configurations may be desirable for certain applications.

SUMMARY

An optical electronic device may include a plurality of different optical sources, and a global shutter sensor including an array of global shutter pixels, with each global shutter pixel including a plurality of storage elements. Furthermore, a controller may be coupled to the plurality of optical sources and the global shutter sensor and configured to cause a first one of the optical sources to illuminate and a first one of the storage elements in each global shutter pixel to store optical data during a first integration period, cause a second one of the optical sources to illuminate and a second one of the storage elements in each global shutter pixel to store optical data during a second integration period, and output the stored optical data from the first and second storage elements of the global shutter pixels after the first and second integration periods.

In accordance with one example embodiment, the plurality of optical sources may be spaced apart from one another. Additionally, each of the optical sources may be configured to emit light at different respective wavelengths. For example, the different wavelengths may be in various ranges such as 200 nm to 400 nm, 400 nm to 700 nm, 700 nm to 1000 nm, etc.

The global shutter sensor may further include a plurality of analog-to-digital converters (ADCs) coupled to the array of global shutter pixels, and the controller may read the stored optical data by causing the ADCs to convert the optical data to digital optical data. Moreover, the global shutter sensor may further include a multiplexer coupled to the ADCs and configured to multiplex the digital optical data from the ADCs as an output of the global shutter sensor. Furthermore, the global sensor pixels may be arranged in rows and columns in the array, each column of the array may include a plurality of bit lines, and the plurality of ADCs may comprise a respective ADC for each of the bit lines. By way of example, the storage elements may comprise capacitors.

Additionally, the controller may be further configured to cause a third one of the optical sources to illuminate and a third one of the storage elements in each global shutter pixel to store optical data during a third integration period, and to output the stored optical data from the first, second, and third storage elements of the global shutter pixels after the first, second, and third integration periods. Further, the controller may be configured to cause third and fourth storage elements from among the plurality of storage elements to respectively store reset signals associated with the first and second integration periods, and to remove respective reset noise from the optical data stored in the first and second storage elements based upon the reset signals stored in the third and fourth storage elements.

A related image sensor, such as the one described briefly above, and optical imaging method are also provide. The method may include causing a first optical source from among a plurality of different optical sources to illuminate a first one of the storage elements in each global shutter pixel to store optical data during a first integration period, causing a second one of the optical sources to illuminate and a second one of the storage elements in each global shutter pixel to store optical data during a second integration period, and outputting the stored optical data from the first and second storage elements of the global shutter pixels after the first and second integration periods.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
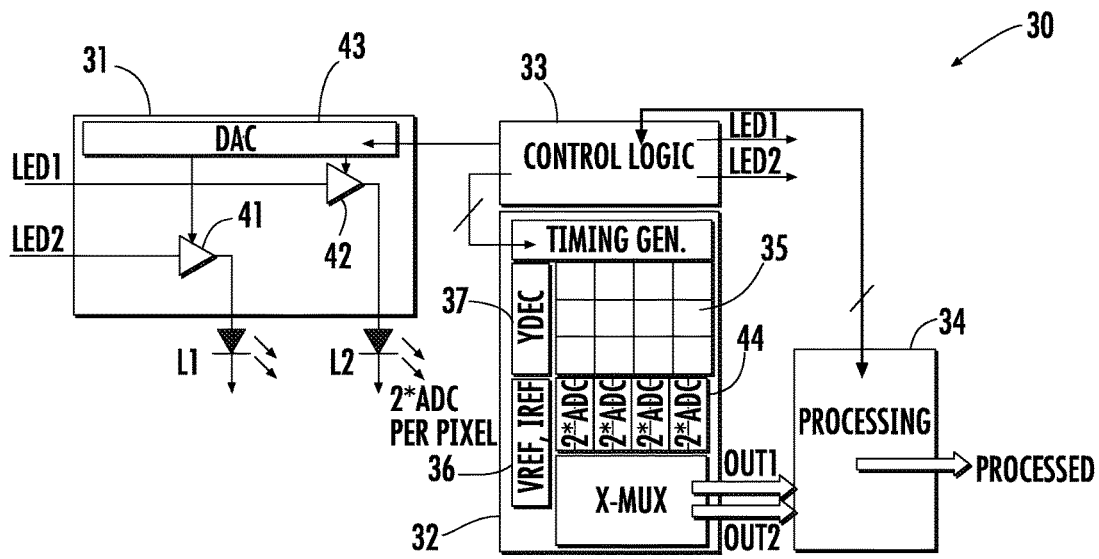
FIG. 1 is schematic block diagram of an optical electronic system including a global shutter pixel sensor in accordance with an example embodiment.
Figure 2:
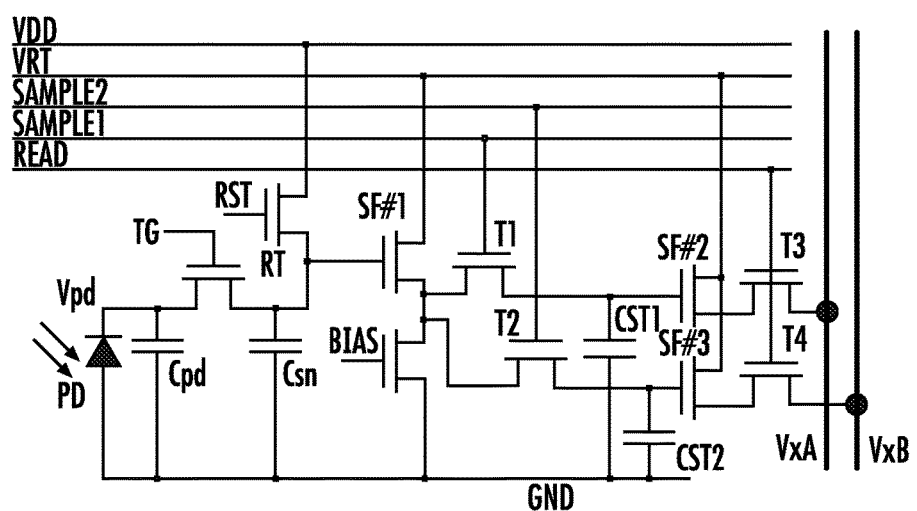
FIG. 2 is a schematic diagram of an example pixel circuit which may be used with the global shutter pixel sensor of the system of FIG. 1.
Figure 3:
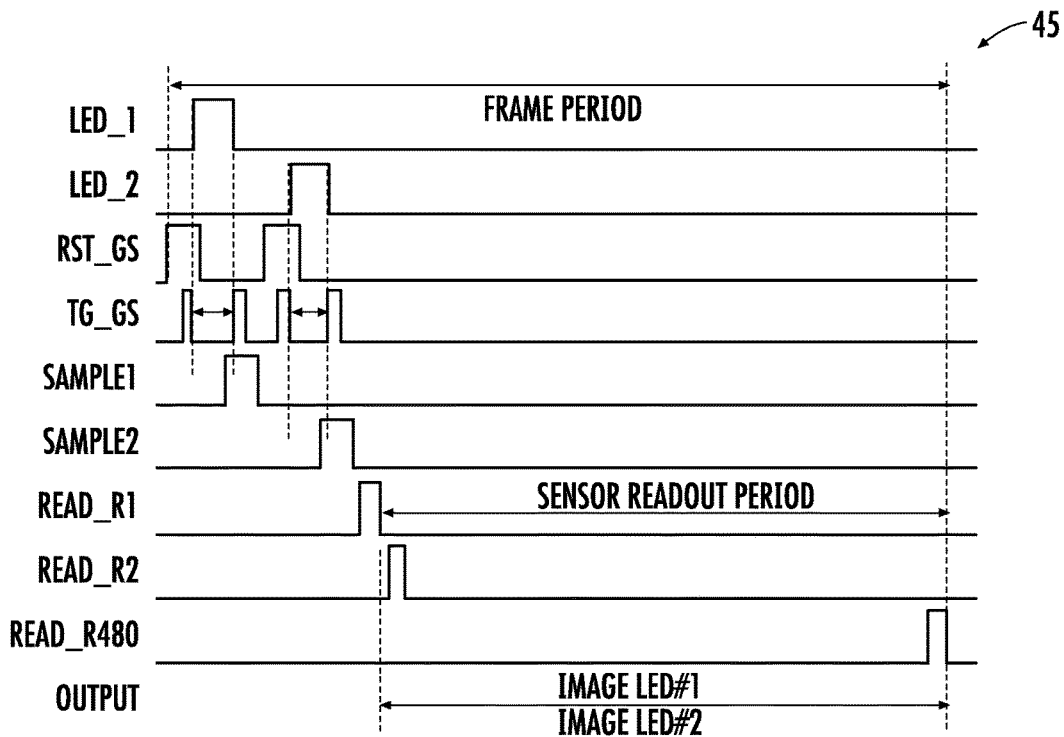
FIG. 3 is a timing diagram for the system of FIG. 1.

Referring initially to FIGS. 1-3, an optical electronic system 30 illustratively includes an optical source module 31, a global shutter pixel sensor 32 and associated control logic 33, and a processor 34 is first described. Generally speaking, the system 30 advantageously allows for high-resolution images with different illumination to be acquired in a relatively short amount of time to help eliminate motion artefacts. More particularly, pixels 35 in the global shutter sensor 32 include at least two storage elements (here capacitors CST1 and CST2) per pixel, so that the illumination (e.g., an LED of one particular wavelength) is illuminated for a first integration period and then stored inside the pixel, and a second illumination source (e.g., and LED of a different wavelength) is illuminated for a second integration period and then stored, after which the whole array is read out. The sensor 32 further illustratively includes voltage/current reference circuitry 36 and YDEC circuitry 37.

An example pixel 35 which may be used with the system 30 is shown in FIG. 2. More particularly, this configuration is a voltage-domain global shutter pixel with two parallel storage elements CST1, CST2, although other voltage domain global shutter configurations, such as with two sequential storage elements, may also be used in some embodiments.

In the implementation illustrated in FIG. 1, two LEDs L1, L2 are provided, each of which is configured to emit light of a different wavelength. For example, the LEDs L1, L2 may emit light in the visible range (400 nm to 700 nm), or in near the IR (700 nm-1000 nm) or near UV (200 nm-400 nm) ranges. The brightness of the LEDs L1, L2 may be adjustable when they are on. The optical source module 31 illustratively includes respective amplifiers 41, 42 for driving the LEDs L1, L2, and the amplifiers 41, 42 receive respective independent control signals LED1, LED2 from the control logic 33 to turn on and off each LED. In the illustrated example, brightness is controlled by a signal (voltage or current) output from a digital to analog converter (DAC) 43, and the brightness of each LED L1, L2, may be independently controlled if desired. The photons emitted from each LED L1, L2 may optionally be focused or collimated using an optical element to project a pattern onto a target, and the reflected photons may be focused onto an imager including the global shutter pixels 35.

As noted above, an advantage of global shutter pixels with dual storage capability is that this allows two images to be acquired in short succession, shorter than the readout period of the image. In the present example, each pixel 35 has two independent output signals OUT1, OUT2, one for each of the capacitive storage elements CST1, CST2 which are connected to a line "Vx" (aka, "bitline") which is common to all the pixels in that column. Hence, there are two bitlines VxA and VxB per column. Each individual bitline Vx may be connected to an individual readout (e.g., analog-to-digital converter (ADC) 44), hence there are two ADCs for each column, and so the two output signals OUT1, OUT2 from each pixel 35 are able to be read out substantially at the same time. The pixel 35 further illustratively includes a photodiode capacitor Cpd, a sense node capacitor Csn, source follower transistors SF#1-SF#3, read/sample switching transistors T1-T4, and reset transistor RT.

Figure 4:
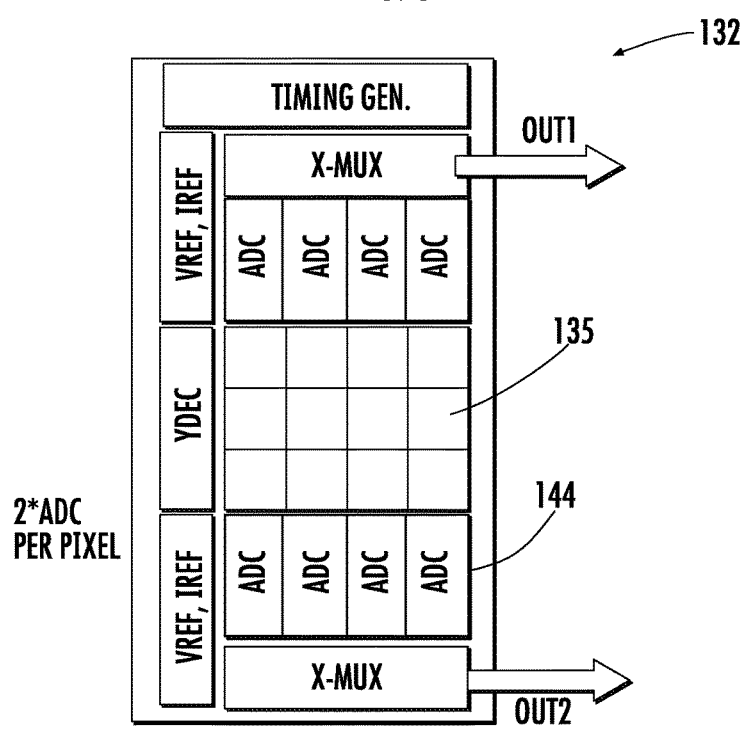
FIG. 4 is a schematic block diagram of another example global shutter sensor arrangement which may be used with the system of FIG. 1.

The system 30 illustratively includes two outputs OUT1, OUT2 per pixel 35, and the two ADCs' (or other readout devices) 44 for each column are adjacent. This implies that the pitch of the ADCs' are half that of the pixel. Depending on the pixel size and process technology, this may not be practical, hence an alternative arrangement for a global shutter sensor 132 is shown in FIG. 4. Here the ADCs 144 are split, half are on the top of the array of pixels 135 and half are on the bottom. In this implementation, the lines VxA may use adjacent ADCs 144 (e.g., bottom), and the lines VxB may use the adjacent ADCs on the other side of the array (e.g., top). Another approach is to have even number columns use one side of the array and the odd number columns use the other side, i.e., lines VxA1, Vx81, VxA3, VxB3 etc. use the ADCs 144 on the bottom of the array and lines VxA2, VxB2, VxA4, VxB4, etc. use the ADCs on the top of the array.

Once each row of signals have been read/converted into digital form, they are multiplexed via a multiplexer X-MUX onto a common output bus (or possibly two output busses, one for data from the ADCs 44 for the lines VxA and one for data from the ADCs for the lines VxB). The output from the sensor 32 is optionally passed to the processing engine 34. For example, the processed signal for pixel #N may be calculated from the signal output from the sensor for each of the exposures, for pixel #N, as follows:

$$\text{PROCESSED}(N) = \text{OUT1}(N) - \text{OUT2}(N). \tag{1}$$

Outputting processing for a scaled difference may be as follows:

$$\text{PROCESSED}(N) = A * \text{OUT1}(N) - S * \text{OUT2}(N). \tag{2}$$

Furthermore, output processing for a 3*2 filter configuration would be as follows:

$$\text{PROCESSED}(N) = A * \text{OUT1}(N-1) + B * \text{OUT1}(N) + C * \text{OUT1}(N+1) + D * \text{OUT2}(N-1) + E * \text{OUT2}(N) + F * \text{OUT2}(N+1). \tag{3}$$

Other suitable output processing approaches may also be used.

A timing diagram 45 for the LEDs and two storage global shutter configuration system 30 with two outputs is shown in FIG. 3. The frame starts with all photodiodes L1, L2 being reset. This is achieved by taking the signals RST_GS and TG_GS high (_GS indicates global shutter, i.e., all pixels and all rows for each of the RST and TG signals). As soon as the TG pulse is low, the pixel 35 is now integrating and sensitive to light, and so the first LED L1 is pulsed on and its light reflected from target object is detected by the pixels. At the end of the determined integration period, the TG pulse is used to transfer the photo-generated charge into the sense node and preferably a transistor Bias for the source follower is enabled and signal SAMPLE1 goes high so the signal from output of the sense-node source follower SF#1 is stored on the first sample/hold capacitor. After the signal has been stored, the signal SAMPLE1 goes low to turn off the transistor T1 which disconnects the storage element CST1 from the source follower. The transistor Bias may be turned off to save power, it may stay fully on to enable faster response, or it may be set to a lower power mode for a trade-off between speed and power consumption, depending on the given implementation.

The photodiode PD is reset by again taking both the signals RST and TG high and then low, but this time the second LED L2 is commanded to turn on and after a predetermined time, the signal TG pulse transfers the charge to the sense node. This time, the signal SAMPLE2 goes high to store the signal from the sense-node source follower's SF#1 output onto the second sample/hold capacitor CST2 in the pixel. After the second signal has been stored, the signal SAMPLE2 goes low to isolate the second sample/hold signal, and the bias signal may optionally go low to turn off the sense-node source follower transistor and save power. In a global shutter pixel arrangement, all of the pixels 35 may be reset and integrating at substantially the same time. Now the images from both LEDs L1, L2 are stored in each pixel, and they may be read out in a row-sequential manner. Once all (or a pre-determined) number of rows have been read out, this cycle may be repeated for further images.

In the system 30, the pitch of the ADCs are ½ that of the pixel. That is, if the pixel is 4 μm×4 μm then the ADC may be maximum 2 μm wide to have the ADCs 44 for each readout adjacent. Depending on the process technology used for implementing the system 30, this may be impractical. As noted above, another arrangement is provided with the sensor 132 or FIG. 4, where there are ADCs 144 at both the top and bottom of the sensor. Hence the pitch of the ADC 144 need only be the same as the pitch of the pixel 135. However, a tradeoff with this approach is that more space may be required on the sensor 32, potentially resulting in a larger and more expensive sensor.

Referring again to FIG. 3, it typically takes 1 μs to 5 μs to reset the pixel, 1 μs to 10 μs to expose, and a further 1 μs to 5 μs to read the charge on the photodiode PD, convert this to a voltage on the sense node capacitor Csn, and then store on the sample/hold capacitor CST1 or CST2. Hence the time for each LED L1, L2 exposure is a minimum 1 μs+1 μs+1 μs=3 μs to a maximum 5 μs 10 μs 5 μs=20 μs. Using the worst case (maximum) value of 20 μs for each LED, then both images can be acquired inside 40 μs, with only 20 μs separating them (that is, no pixel readout is required). By way of contrast, in typical global shutter configuration there would be approximately 10 ms of time between two successive exposures because of the requisite readout therebetween. Hence, the system 300 may advantageously provide approximately 500× faster exposure between successive exposures.

By way of comparison, consider an example for a typical global shutter sensor which has a horizontal field of view of 50° and the object is 10 cm away from the sensor. For a field of view calculation:

$$HFOV_{mm} = 2 * \tan\left(\frac{50°}{2}\right) * 10 \text{ cm} = 9.3 \text{ cm}, \quad (4)$$

if the object is travelling at 1 m/sec and the time between images is 10 ms, then it will have traveled 10 mm between successive images. This is approximately 10% across the field of view. If the sensor is 640H pixels wide, this corresponds to 64 pixels of motion on the image sensor. Yet, for the system 30, using this same example, there would be a movement of the object of 20 μm instead of the 10 mm using a conventional global shutter sensor configuration, and this is equivalent to 0.128 pixel movement instead of the previously mentioned 64 pixel movement.

For the system 30, since the motion of the object between two images is substantially less than one pixel, the object is essentially unmoved between the two images, and further processing/study/analysis of the two images may assume that they were taken simultaneously. Moreover, when different wavelengths of illumination are used, it may be assumed that any difference between these two images is solely due to the difference in the object (or background) reflectivity in these two wavelengths, and not due to any motion. It should also be noted that the apparent motion of 0.128 pixels across the sensor 32 is an order of magnitude less than the pixel pitch, which may allow for further enhancement and simplifications in some configurations.

Figure 5:
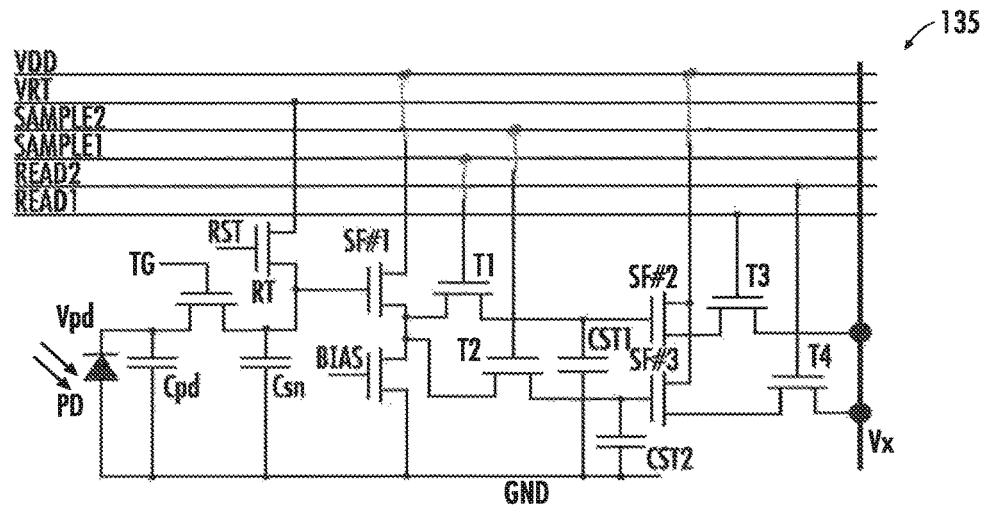
FIG. 5 is a schematic diagram of another example pixel circuit which may be used with the global shutter pixel sensor of the system of FIG. 1 with a single output line.
Figure 6:
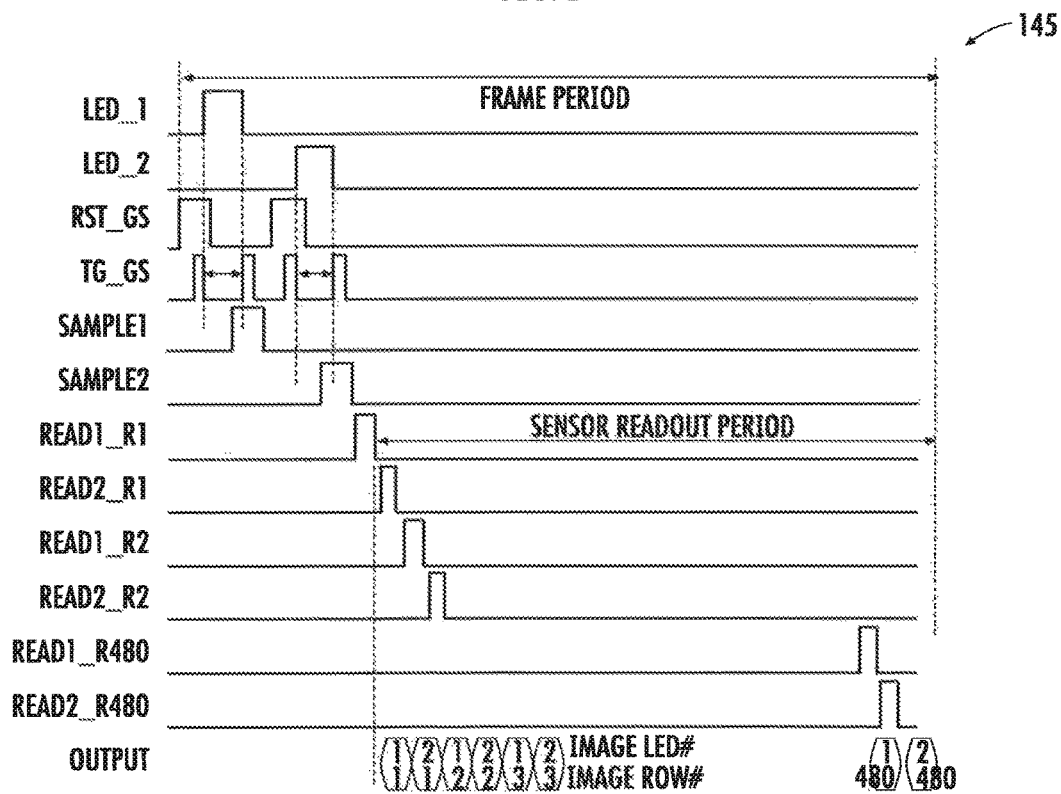
FIG. 6 is a timing diagram similar to that of FIG. 3 but for the single pixel output configuration of FIG. 5.

Referring additionally to FIGS. 5 and 6, another global shutter voltage domain pixel 135 arrangement is shown with dual storage capacitors CST1, CST2 as in the pixel 35, but a single output line Vx. The storage capacitors CST1, CST2 may still be independently written to using the signals SAMPLE1 and SAMPLE2, however they share a common output and are both connected to the line Vx. This has various layout advantages and may result in a pixel which is smaller and thereby cheaper than the implementation with two output Vx lines as shown in FIG. 2, and thus may be desirable in certain applications. However, since there are two storage elements CST1, CST2 in each pixel 135 but only a single pixel output Vx line, the readout is time-division multiplexed.

More particularly, as seen in the timing diagram 145, a result of a single output terminal with two storage elements CST1, CST2, two pixel reads are used for each row—one for each storage element. Each pixel read cycle typically includes the ADC in each column and its output. Hence the output data is also interleaved between the signals for each LED.

Figure 7:
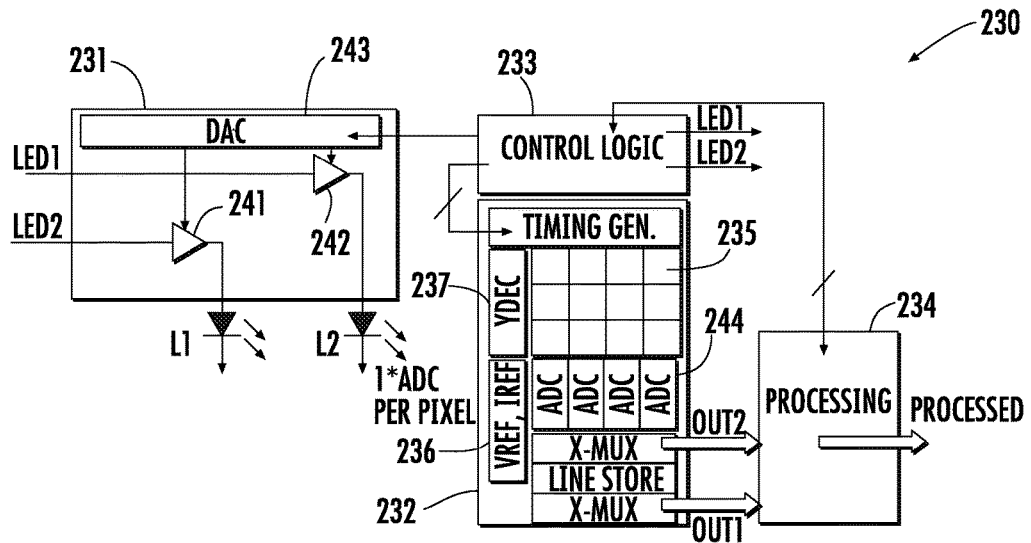
FIG. 7 is a schematic block diagram of another example of an optical electronic system similar to that of FIG. 1 but with one output per pixel and internal line storage.

Under typical usage, the two output signals may be de-interleaved. This may be achieved by having an additional digital storage LINE STORE in the sensor device, as shown in the example system 230 of FIG. 7. Here, the data from the first sample/hold (S/H) readout is converted from analog to digital and stored in the digital storage LINE STORE, and then the second S/H readout is ADC and readout simultaneously with the data from the digital storage LINE STORE. The remaining components 231-237, and 241-243 are similar to their counterparts described above with respect to FIG. 1. It should be noted that in some implementations, the extra digital storage LINE STORE within the sensor 232 may be undesirable if a small sensor die is required. In such cases, the line store may be external to the sensor 232.

Figure 8:
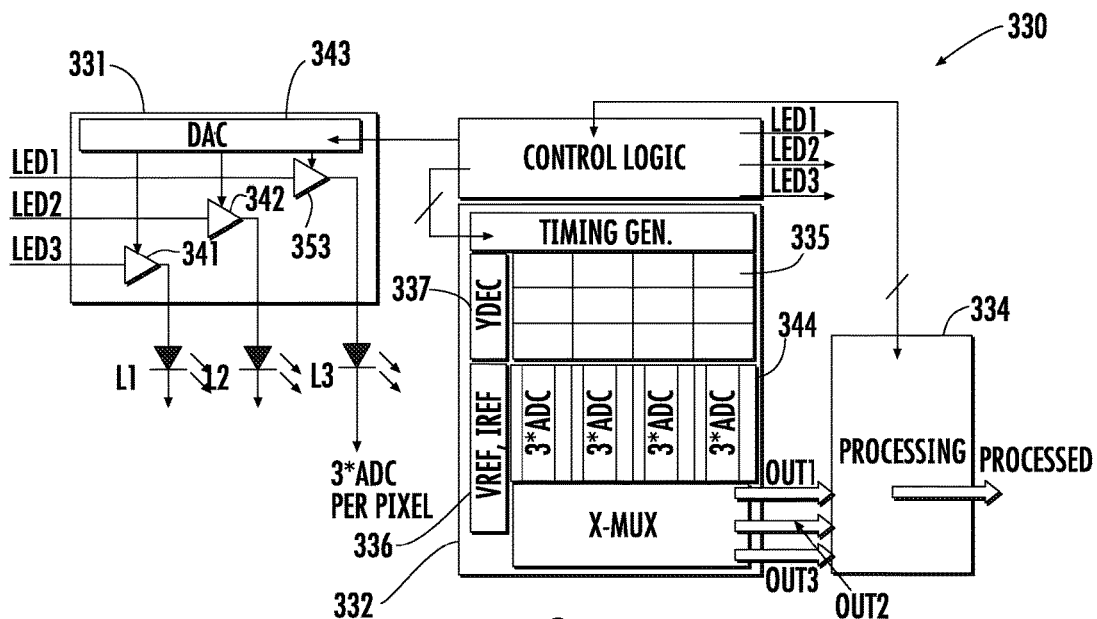
FIG. 8 is a schematic diagram of another example pixel circuit including three parallel storage elements.
Figure 9:
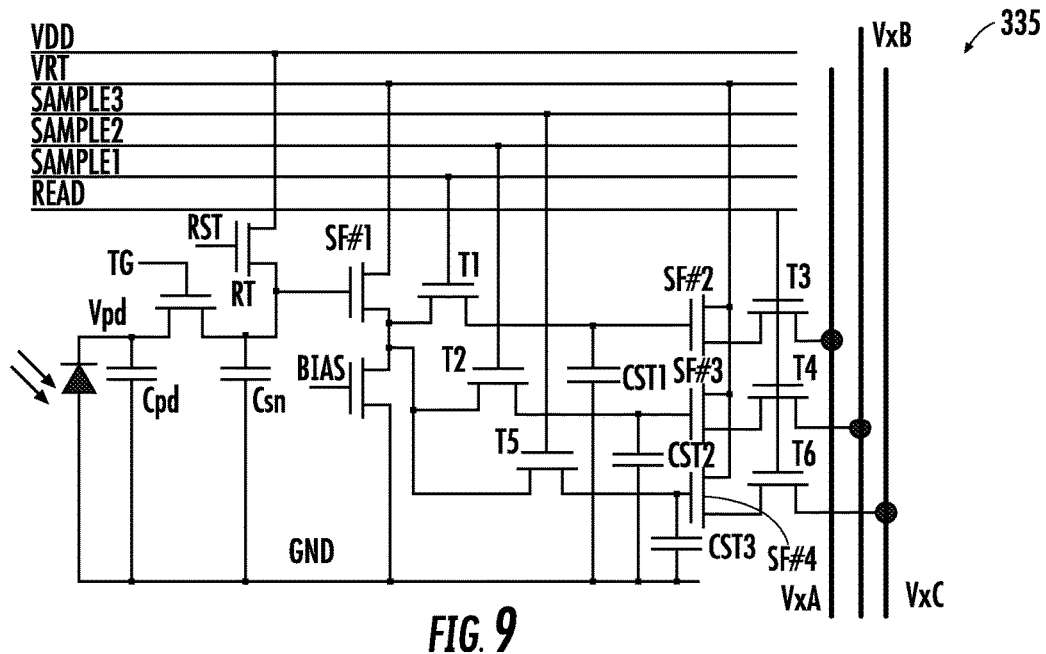
FIG. 9 is a schematic block diagram of another example of an optical electronic system including the pixel circuit of FIG. 8.
Figure 10:
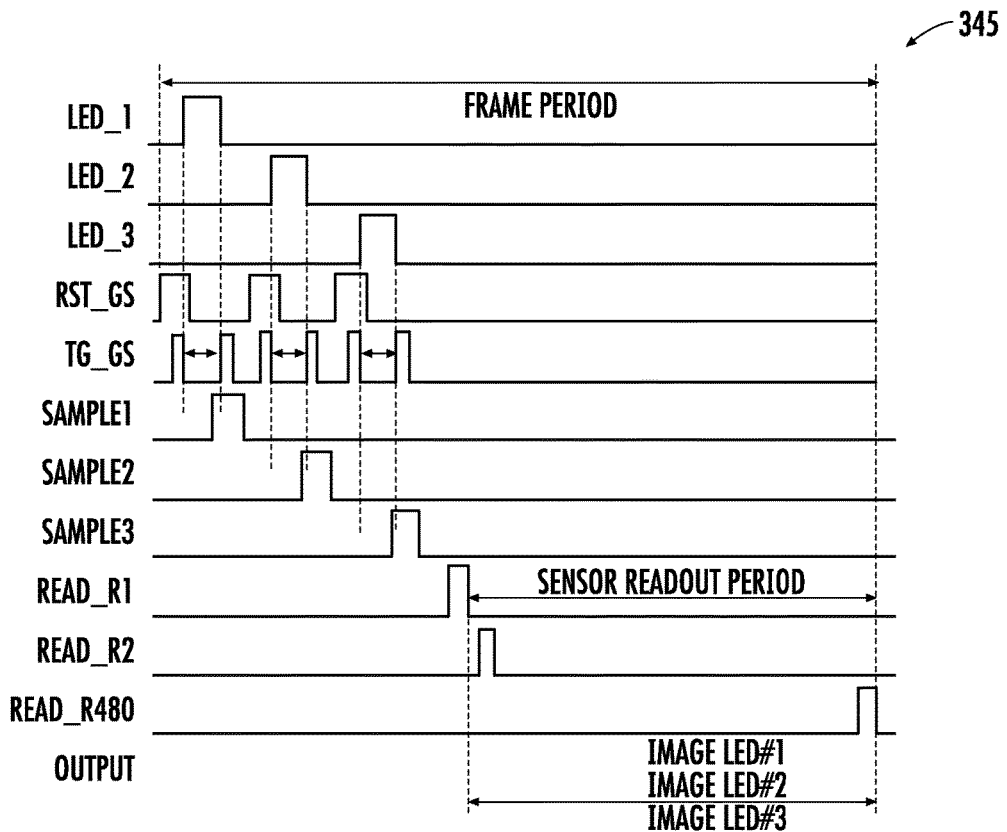
FIG. 10 is a timing diagram for the system of FIG. 9.

For certain machine vision applications, a system with only two different wavelengths may be acceptable. However, for other applications, e.g., when images are to be viewed by humans, a three (or more) color system may be used. Turning to FIGS. 8-10, the above-described approach may be readily extended to operate with three (or more) LEDs L1-L3 (which have respective amplifiers 341, 342, 353) in the system 330. The remaining components 331-334, 336-337, and 341-343 are similar to their counterparts described above with respect to FIG. 1.

An example implementation for the pixel 335 for the system 330 is shown in FIG. 9. Note that this configuration further includes additional switching transistors T5, T6, as well as source follower transistor SF#4 and a third storage capacitor CST3. A voltage domain pixel 335 configuration may be desirable due to problems in switching the charge to different storage elements and the relatively complex process technology that this would require. Note that the pixel 335 shown in FIG. 9 has three output bitlines VxA, VxB, VxC. As discussed previously, it is also possible to instead operate with a single bitline which is time-division multiplexed between the three signals, with similar reduction in readout rate.

In the system 330, there is no additional storage (outside of the ADCs 244), which restricts the image processing to one dimension (i.e., a single line). An example type of processing which may be used for captured image data is color matrixing as shown in Equation (5) below:

$$\begin{pmatrix} Y \\ U \\ V \end{pmatrix} = \begin{pmatrix} 0.3 & 0.59 & 0.11 \\ -0.17 & -0.33 & 0.50 \\ 0.50 & -0.42 & -0.08 \end{pmatrix} \cdot \begin{pmatrix} R \\ G \\ B \end{pmatrix}. \quad (5)$$

If 2D image processing of the image is desired, then further storage may be added. For example, the additional memory may be added between the output of the multiplexer X-MUX and the processor 334. The timing diagram 345 for the system 330 is shown in FIG. 10.

As discussed previously, having three outputs and three ADCs fitting in the width of each pixel or column may not be feasible in certain implementations. Hence, in such instances a single output bitline from each pixel may be used, along with a single ADC (or other suitable readout circuitry) and on-chip storage such that all three output signals OUT1-OUT3 are available simultaneously. However, it is not necessary to store the data on-chip, and external line storage or external frame storage may also be used.

For certain machine vision applications, a system with four (or more) wavelengths may provide a further advantage. The four wavelengths may all be in the visible region, or the system may operate with three visible light sources and one outside the visible spectrum (e.g., NIR 700 nm-1000 nm, or NUV 200 nm-400 nm). The above-described systems may be extended to operate with four (or more) LEDs. Here again, the associated global shutter pixel may have a corresponding number of output bitlines (i.e., four in this example), or if preferred a single bitline which is time-division multiplexed between the four signals (with similar reduction in readout rate) may be used, as discussed further above. For a four LED configuration, the global shutter sensor may have the ADC pitch ¼ that of the pixel and then have all the ADCs for a column adjacent, or it may have the ADC pitch ½ that of the pixel and then split the 4 ADCs for each pixel such that two are on top of the array and two are on the bottom of the array.

Figure 11:
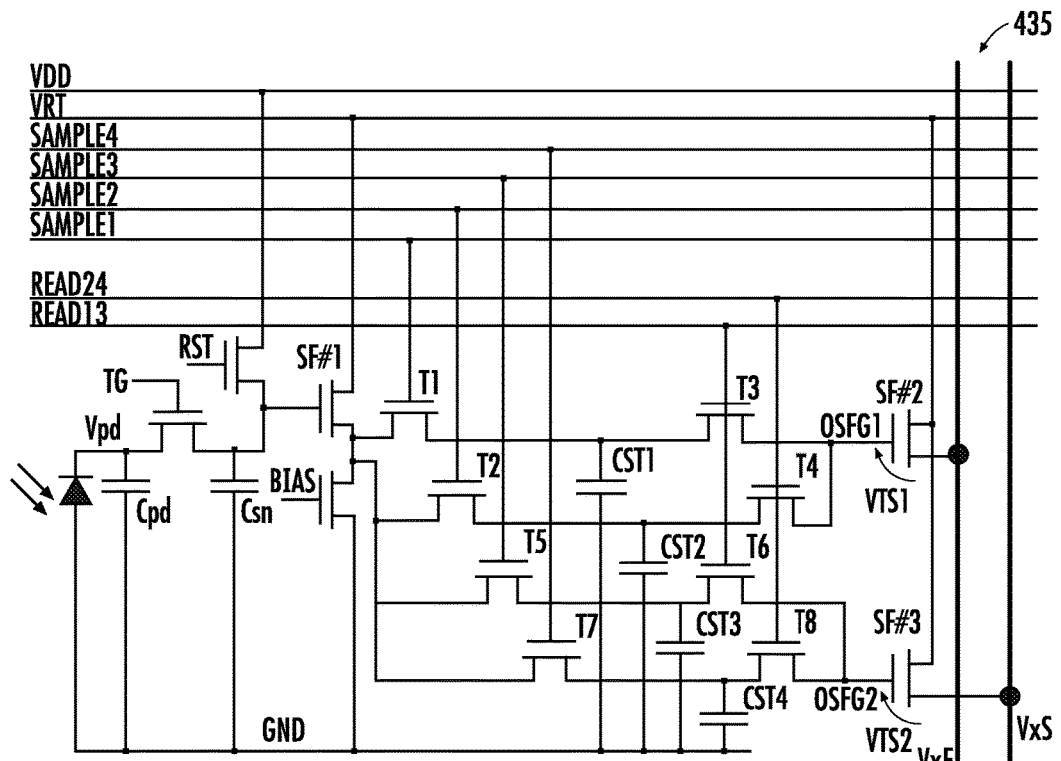
FIG. 11 is a schematic diagram of another example pixel circuit including four storage elements which may used to provide reset noise reduction.
Figure 12:
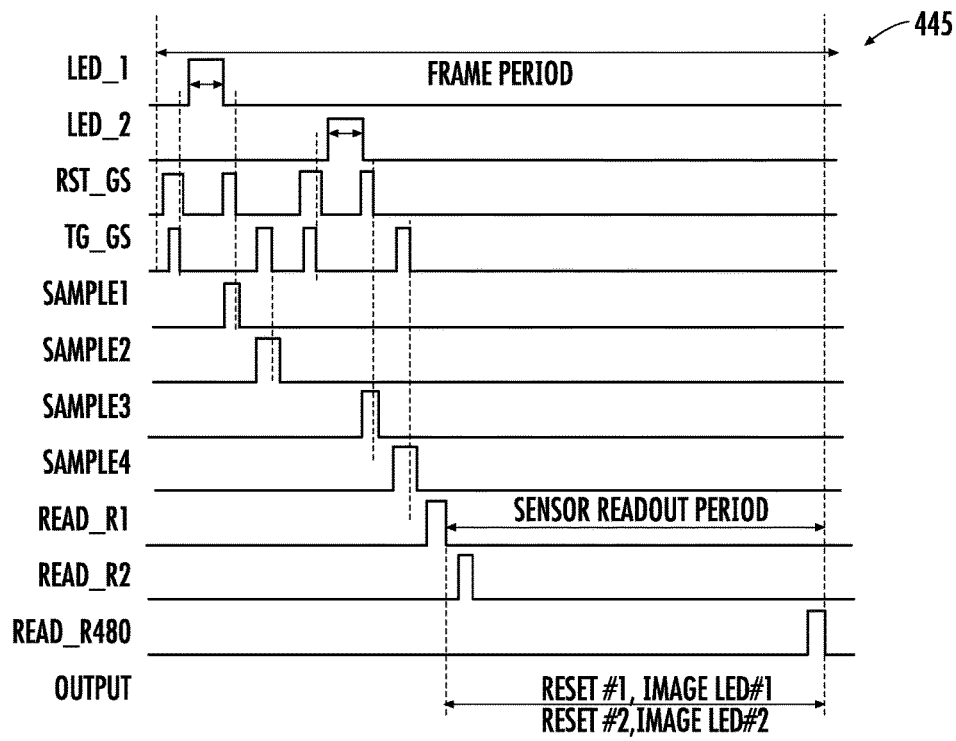
FIG. 12 is a timing diagram associated with the pixel circuit of FIG. 11.

Turning now to FIGS. 11 and 12, in the above description, each storage element in a given global shutter pixel stores a signal which corresponds to the charge collected during the illumination phase of the photodiode. Typically, the photodiode will be buried and can be fully depleted, and hence there is no reset noise (aka "kTC" noise) on this node. However, the floating diffusion (aka "sense node") capacitor Csn is not fully depleted and it is not possible to reset this node perfectly, and so an uncertainty, or noise (reset noise/kTC noise) is generated. Typically this node is of small capacitance (1 pF) to increase the conversion gain of the pixel, and so the voltage noise generated on this node {V=SQRT(kT/C)} will be SQRT(1.38E-23*300/1E-15)=2 mV. If the full-range swing on the pixel is 1V and is measured with a 10 bit ADC, then 2 mV will produce a noise of 2 bits.

In the illustrated example, the pixel 435 and four storage elements CST1-CST4 in each pixel 435 for use with two sets of LEDs, which makes it possible to compensate for the reset noise using a technique called "correlated double sampling". With this technique, the sense node (capacitor Csn) is reset, sampled and stored and then the photo-generated charge is transferred and stored. The difference between these two samples is then free of the reset noise. These operations are repeated for the second illumination source, and so signals from both illumination sources are free from reset noise. The pixel 435 illustratively includes switching transistors T1-T8.

As seen in the timing diagram 445, at the start of each frame period, signal RST_GS and TG_GS go high, which resets all of the photodiodes PD in all the pixels 435. After these signals go low, then the photodiode is integrating and the LED L1 is pulsed on. At the end of the LED illumination phase, the signal RST_GS goes high (but the signal TG_GS is kept low so the photo-generated charge remains on the photodiode), and the signal SAMPLE1 goes high which causes the reset signal to be sampled on capacitor CST1. The signal RST_GS signal should go low before the signal SAMPLE1, as it is when the RST_GS signal goes low that the noise on the floating diffusion is sampled onto the CSN capacitance. Then, the signal TG_GS goes high, which transfers photo-generated charge stored on the photodiode to the sense node capacitor Csn, and the signal SAMPLE2 signal goes high so that this signal is stored on the capacitor CST2.

This cycle is repeated with LED L2 pulsed on, signal SAMPLE3 causing the reset signal to be stored on the capacitor CST3, and the signal SAMPLE4 causing the photo-signal to be stored on the capacitor CST4. Note that in this approach, the signals stored in the pixels 435 are not read out of the pixel array until after the signal SAMPLE4 occurs, which allows for a very rapid operation between the pulsing of the LEDs, e.g., 1 μs to 10 μs.

The signals may be read out in a row-by-row fashion. If there are four outputs conductors per pixel, then a correction may be provided for the variation in threshold voltages of the source follower's in each pixel. There are various ways to achieve this, one of which is to readout the stored values on capacitors CST1-CST4, then turn on the signal RST_GS and read out a reference voltage to compensate the variation in threshold voltages.

Another embodiment of the noise reduction configuration described above is now described with reference to FIGS. 13 and 14. In the illustrated global shutter pixel 535, the capacitor CST1 stores the reset signal from the first LED exposure (VDD−VKTC1), the capacitor CST2 stores the exposed signal from the first exposure (VDD−VKTC1−Vphoto1), the capacitor CST3 stores the reset signal from the second LED exposure (VDD−VKTC2), and the capacitor CST4 stores the exposed signal from the second LED exposure (VDD−VKTC2−Vphoto2). Moreover, voltages VTS1 and VTS2 are the threshold voltages on the two output source follower transistors SF#2, SF#3.

Since there are four voltages stored on capacitors CST1-CST4 (VCST1-VCST4, respectively) and two output conductors VxF and VxS, two read operations are used to read them out, as follows Phase 1:
Take READ13 high and READ24 low
VxF$_1$ is VCST1−VTS1, and
VxS$_1$ is VCST3−VTS2.
(Note that the "1" subscript indicates that this is the voltage on the first phase of reading).

Phase 2:
Take READ13 low and READ24 high
VxF$_2$ is VCST2−VTS1, and
VxS$_2$ is VCST4−VTS2.
Now subtracting these pairs of signals:

$$VCDS1=VxF_2-VxF_1=(VCST2-VTS1)-(VCST1-VTS1)=(VCST2-VCST1), \text{ and}$$

$$VCDS2=VxS_2-VxS_1=(VCST4-VTS2)-(VCST3-VTS2)=(VCST4-VCST3).$$

Hence the threshold voltages from the output source follower transistors are cancelled. Further, the kTC noise is cancelled:

$$VCDS1=(VDD-VKTC1)-(VDD\ VKTC1-V\text{photo1})=V\text{photo1, and}$$

$$VCDS2=(VDD-VKTC2)-(VDD-VKTC2-V\text{photo2})=V\text{photo2}$$

Figure 13:
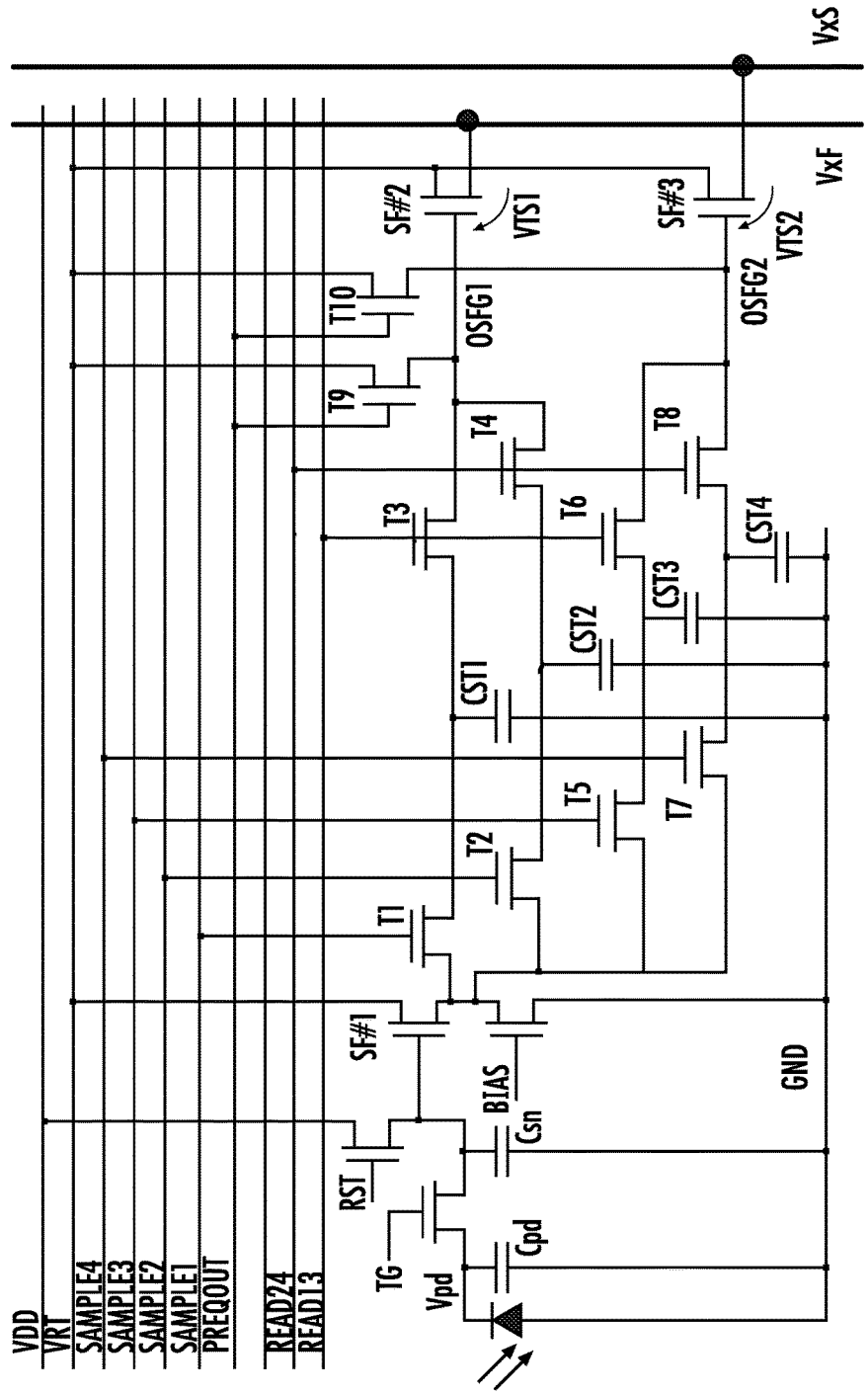
FIG. 13 is a schematic diagram of another example pixel circuit providing reset noise reduction.
Figure 14:
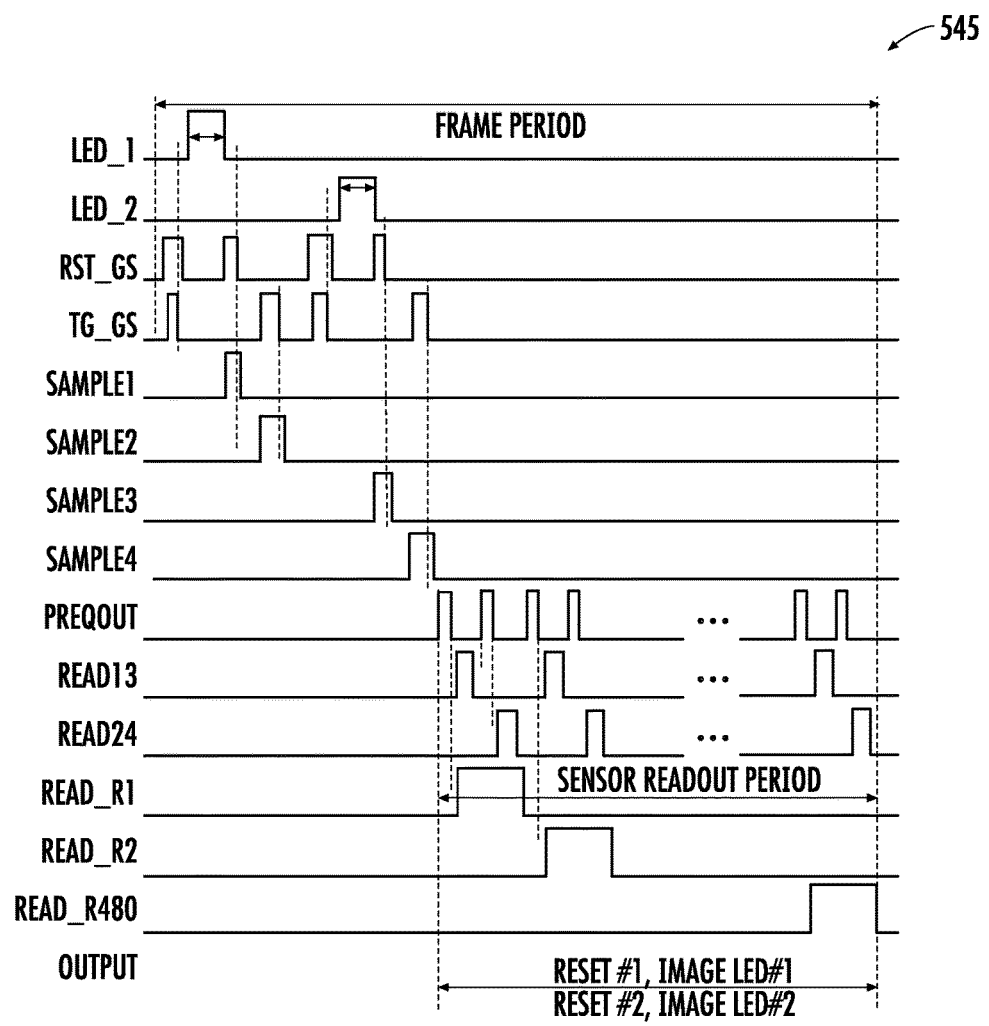
FIG. 14 is a timing diagram associated with the pixel circuit of FIG. 13.

Note that in the pixel 535 shown in FIG. 13, there is charge sharing between the larger (e.g., 15 fF type) storage capacitor and the smaller (e.g., 1 fF) of the gate of the source follower. Hence the voltage on the gate OSFG1 or OSFG2 prior to signals READ13 or READ24 going active will affect the voltage of the gate OSFG1 or OSFG2 after the signal READ13/READ24 goes active. Hence, it may be desirable to pre-charge these voltages to a fixed level so that the charge sharing effect is constant and there is no memory of previous values (VCST1 to VCST4) from previous images, which would affect (i.e., add noise) to the readout. This may be achieved by adding the transistors T9, T10 which allow the gate OSFG1 and OSFG2 to be charged to a predefined voltage (VRT in this example) prior to the signals READ13 and READ14 going high. It should be noted that the signals READ13, READ24, and PREQOUT, may be global to the sensor (i.e., connected to all the pixels on the array), or be local to a row (i.e., gated with the row select signal, e.g. the signal READ_Rn).

In the foregoing embodiments, the different optical sources (i.e., the LEDS L1, L2, etc.) are co-located and each emits light at different respective wavelengths, as discussed above. However, in different embodiments, the optical sources may be spaced apart and/or of a same optical wavelength. By way of example, this approach may be used to provide depth map imaging or ranging to an object using a "structured light" approach. In this regard, a pattern of light (e.g., such as stripes, dots, or a pseudo-random pattern)—which may be visible or invisible to the human eye, such as near infrared—is projected onto a scene. Using parallax, the distortion of this pattern may be observed and the depth may be deduced.

Using two (or more) sources of light which are spaced apart allows for two different measurements, and a distance may accordingly be calculated from these measurements. In accordance with an example global shutter implementation, the optical sources may be at least 5 cm apart, although other distances may be used in different configurations. Here again, optical data from the different optical sources is stored in respective storage capacitors during each of the integration periods before any read out, which advantageously provides for relatively little time between the image captures to avoid any significant degradation in accuracy of the distance measurement due to movement of the object (or sensor) during the reading phase, as described further above.

Figure 15:
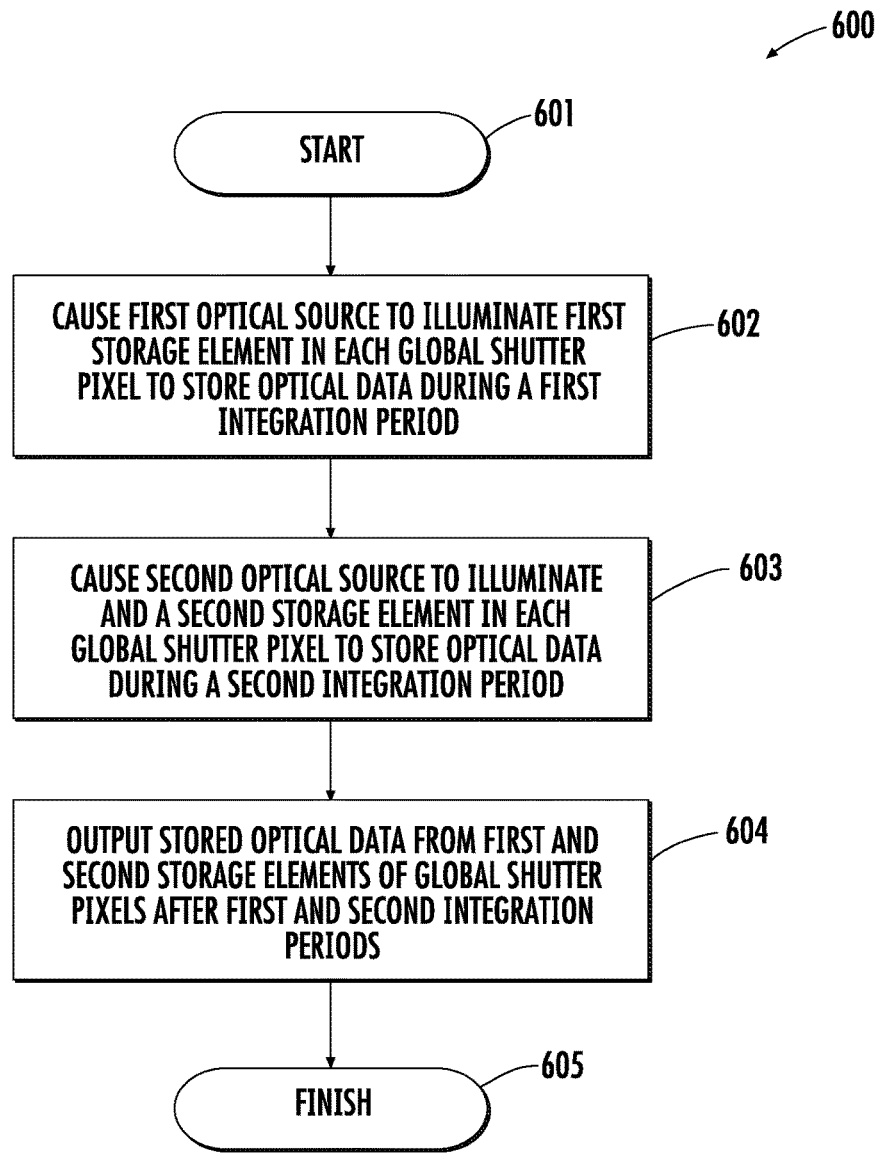
FIG. 15 is a flow diagram illustrating method aspects associated with the system of FIG. 1.

A related optical imaging method is now described with reference to the flow diagram 600 of FIG. 15. Beginning at Block 601, the method illustratively includes causing a first optical source L1 (see FIG. 1) from among a plurality of optical sources L1-L2 to illuminate a first one of storage elements CST1 in each global shutter pixel 35 to store optical data during a first integration period, at Block 602. The method may further include causing a second one of the optical sources L2 to illuminate a second one of the storage elements CST2 in each global shutter pixel 35 to store optical data during a second integration period, at Block 603. As noted above, the optical sources L1, L2 may be of the same or different wavelengths, and they may be co-located or spaced apart. The method further illustratively includes outputting the stored optical data from the first and second storage elements of the global shutter pixels after the first and second integration periods, at Block 604, which illustratively concludes the method of FIG. 15 (Block 605).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical electronic device comprising:
a plurality of different optical sources;
a global shutter sensor comprising an array of global shutter pixels, each global shutter pixel comprising a plurality of amplifiers and a plurality of storage elements coupled to one or more inputs of the plurality of amplifiers; and
a controller coupled to said plurality of optical sources and said global shutter sensor and configured to
cause a first one of the optical sources to illuminate and a first one of the storage elements in each global shutter pixel to store optical data during a first integration period,
cause a second one of the optical sources to illuminate and a second one of the storage elements in each global shutter pixel to store optical data during a second integration period,
cause an input of a first one of the amplifiers to charge to a predefined voltage prior to an outputting of the stored optical data from the first storage element,
cause an input of a second one of the amplifiers to charge to the predefined voltage prior to an outputting of the stored optical data from the second storage element, and
output the stored optical data from the first and second storage elements of said global shutter pixels after the first and second integration periods.

2. The optical electronic device of claim 1 wherein said plurality of optical sources are spaced apart from one another.

3. The optical electronic device of claim 1 wherein the plurality of different optical sources comprises a non-visible light source, and wherein the non-visible light source has a wavelength in a range of 200 nm to 400 nm.

4. The optical electronic device of claim 1 wherein the plurality of different optical sources comprises a visible light source, and wherein the visible light source has a wavelength in a range of 400 nm to 700 nm.

5. The optical electronic device of claim 1 wherein the plurality of different optical sources comprises a non-visible light source, and wherein the non-visible light source has a wavelength in a range of 700 nm to 1000 nm.

6. The optical electronic device of claim 1 wherein said global shutter sensor further comprises a plurality of analog-to-digital converters (ADCs) coupled to said array of global shutter pixels; and wherein said controller reads the stored optical data by causing the ADCs to convert the optical data to digital optical data.

7. The optical electronic device of claim 6 wherein said global shutter sensor further comprises a multiplexer coupled to said ADCs configured to multiplex the digital optical data from said ADCs as an output of said global shutter sensor.

8. The optical electronic device of claim 6 wherein said global shutter pixels are arranged in rows and columns in said array; wherein each column of said array comprises a plurality of bit lines; and wherein said plurality of ADCs comprises a respective ADC for each of the bit lines.

9. The optical electronic device of claim 1 wherein the storage elements comprise capacitors.

10. The optical electronic device of claim 1 wherein said controller is further configured to cause a third one of the optical sources to illuminate and a third one of the storage elements in each global shutter pixel to store optical data during a third integration period, and to output the stored optical data from the first, second, and third storage elements of said global shutter pixels after the first, second, and third integration periods.

11. The optical electronic device of claim 1 wherein said controller is further configured to cause third and fourth storage elements from among the plurality of storage elements to respectively store reset signals associated with the first and second integration periods; and wherein said controller is further configured to remove respective reset noise from the optical data stored in the first and second storage elements based upon the reset signals stored in the third and fourth storage elements.

12. An image sensor for use with a plurality of different optical sources, the image sensor comprising:
 a global shutter sensor comprising an array of global shutter pixels, each global shutter pixel comprising a plurality of storage elements and a plurality of source followers having gate terminals coupled to the plurality of storage elements; and
 a controller coupled to said plurality of optical sources and said global shutter sensor and configured to
  cause a first one of the optical sources to illuminate and a first one of the storage elements in each global shutter pixel to store optical data during a first integration period,
  cause a second one of the optical sources to illuminate and a second one of the storage elements in each global shutter pixel to store optical data during a second integration period,
  cause a gate terminal of a first one of the plurality of source followers to charge to a fixed voltage after the first integration period and prior to an outputting of the stored optical data in the first storage element,
  cause a gate terminal of a second one of the plurality of source followers to charge to the fixed voltage after the second integration period and prior to an outputting of the stored optical data in the second storage element, and
  output the stored optical data from the first and second storage elements of said global shutter pixels after the first and second integration periods.

13. The image sensor of claim 12 wherein said plurality of optical sources are spaced apart from one another.

14. The image sensor of claim 12 wherein said global shutter sensor further comprises a plurality of analog-to-digital converters (ADCs) coupled to said array of global shutter pixels; and wherein said controller reads the stored optical data by causing the ADCs to convert the optical data to digital optical data.

15. The image sensor of claim 14 wherein said global shutter sensor further comprises a multiplexer coupled to said ADCs configured to multiplex the digital optical data from said ADCs as an output of said global shutter sensor.

16. The image sensor of claim 14 wherein said global shutter pixels are arranged in rows and columns in said array; wherein each column of said array comprises a plurality of bit lines; and wherein said plurality of ADCs comprises a respective ADC for each of the bit lines.

17. An optical imaging method for a global shutter sensor comprising an array of global shutter pixels, each global shutter pixel comprising a plurality of storage elements and a plurality of amplifiers having inputs coupled to at least one of the plurality of storage elements, the method comprising:
 causing a first optical source from among a plurality of different optical sources to illuminate and a first one of the storage elements in each global shutter pixel to store optical data during a first integration period;
 causing a second one of the optical sources to illuminate and a second one of the storage elements in each global shutter pixel to store optical data during a second integration period;
 causing an input of a first one of the plurality of amplifiers to charge to a predetermined voltage after the first integration period and the second integration period;
 causing an input of a second one of the plurality of amplifiers to charge to the predetermined voltage after the first integration period and the second integration period; and
 outputting the stored optical data from the first and second storage elements of the global shutter pixels after the first and second integration periods.

18. The method of claim 17 wherein the plurality of optical sources are spaced apart from one another.

19. The method of claim 17 wherein the global shutter sensor further comprises a plurality of analog-to-digital converters (ADCs) coupled to the array of global shutter pixels; and wherein outputting comprises reading the stored optical data by causing the ADCs to convert the optical data to digital optical data.

20. The method of claim 17 further comprising causing a third one of the optical sources to illuminate and a third one of the storage elements in each global shutter pixel to store optical data during a third integration period; and wherein outputting comprises outputting the stored optical data from the first, second, and third storage elements of the global shutter pixels after the first, second, and third integration periods.

21. The method of claim 17 further comprising:
causing third and fourth storage elements from among the plurality of storage elements to respectively store reset signals associated with the first and second integration periods; and
removing respective reset noise from the optical data stored in the first and second storage elements based upon the reset signals stored in the third and fourth storage elements.

\* \* \* \* \*